(12) United States Patent
Zhang et al.

(10) Patent No.: US 8,120,302 B2
(45) Date of Patent: Feb. 21, 2012

(54) SERVO CONTROL APPARATUS

(75) Inventors: Wennong Zhang, Kitakyushu (JP);
Mitsujiro Sawamura, Kitakyushu (JP);
Yasuyuki Takei, Kitakyushu (JP)

(73) Assignee: Kabushiki Kaisha Yaskawa Denki, Kitakyushu-shi (JP)

( * ) Notice: Subject to any disclaimer, the term of this patent is extended or adjusted under 35 U.S.C. 154(b) by 510 days.

(21) Appl. No.: 12/302,597

(22) PCT Filed: Jan. 23, 2007

(86) PCT No.: PCT/JP2007/051010
§ 371 (c)(1),
(2), (4) Date: Feb. 17, 2009

(87) PCT Pub. No.: WO2007/138758
PCT Pub. Date: Dec. 6, 2007

(65) Prior Publication Data
US 2009/0243533 A1    Oct. 1, 2009

(30) Foreign Application Priority Data
May 26, 2006 (JP) ................................ 2006-146727

(51) Int. Cl.
*G05B 11/36* (2006.01)
*G05B 1/02* (2006.01)
*G05B 6/02* (2006.01)

(52) U.S. Cl. ........ 318/609; 318/437; 318/608; 318/621; 318/632

(58) Field of Classification Search .................. 318/434, 318/437, 448, 608–611, 621, 623, 629, 632; 388/906
See application file for complete search history.

(56) References Cited

U.S. PATENT DOCUMENTS
6,252,369 B1 *    6/2001    Kaku et al. .................... 318/609

FOREIGN PATENT DOCUMENTS
JP    2002-182705 A    6/2002
JP    2003-33066 A    1/2003
WO    2005/093939 A1    10/2005

OTHER PUBLICATIONS

Yamada, Koji, et al., "Study on Higher Order Disturbance Observer and Robust Stability", T. IEE Japan, vol. 117-C, No. 12, 1997, pp. 1776-1781.

* cited by examiner

*Primary Examiner* — Derek Rosenau
(74) *Attorney, Agent, or Firm* — Sughrue Mion, PLLC

(57) ABSTRACT

A servo control apparatus capable of suppressing adverse effects of disturbance, load variation and the like, and realizing robust and high-performance speed control. The apparatus includes both of the following observers: a disturbance observer for adding a disturbance compensation torque $T_f$, calculated from a torque command T* and an electric motor rotational speed $\omega_m$, to a torque command basic signal $T_0^*$, calculated on the basis of a deviation between a speed command $\omega^*$ and a feedback speed $\omega_f$ by a PI control section, thus outputting the torque command T*; and a phase advance compensation observer for generating, from the torque command basic signal $T_0^*$ and the electric motor rotational speed $\omega_m$, an output of a nominal plant serving as an element in which no delay occurs, thus outputting the output as the feedback speed $\omega_f$.

11 Claims, 12 Drawing Sheets

SERVO CONTROL APPARATUS

TECHNICAL FIELD

The present invention relates to a servo control apparatus for performing feedback drive control on a load machine in which inertia is significantly varied.

RELATED ART

The speed control of a normal servo apparatus is carried out by feeding back the rotational speed of an electric motor and using a PI control, and it is necessary to exactly know the total inertia of mechanical movable sections including a rotor of the electric motor in order to achieve a good control performance. However, when the inertia variation of a load machine or estimation error is significant, the open loop gain of a control system is greatly changed, and therefore, the characteristics of the control system are significantly changed, which might make it impossible to realize robust and high-performance control.

In a first conventional technique, there is used a disturbance observer, which is well known as being able to suppress disturbance, parameter variation and the like (see Non-Patent Document 1, for example). FIG. 3 is a block diagram showing a configuration of a servo control apparatus in which the first conventional technique is used. In this diagram, 4 denotes an actual plant including a rotor of an electric motor and a load machine, and a transfer function from a torque command to the rotational speed of the electric motor is shown. Further, 5 denotes a disturbance observer including a nominal plant inverse system 53 and a first low-pass filter 52. Furthermore, 2 denotes a PI control section.

In addition, ω* denotes a speed command, $\omega_m$ denotes an electric motor rotational speed, T* denotes a torque command, $T_0$* denotes a torque command basic signal, $T_f$ denotes a disturbance compensation torque, J denotes an actual plant inertia, $J_n$ denotes a nominal plant inertia, and s denotes a Laplacian operator.

Next, the principle of operation will be described. For the sake of simplicity, the first low-pass filter 52 is defined as a primary low-pass filter represented by Equation (1).

[Eq. 1]

$$L_1(s) = \frac{1}{1+T_1 s} \quad (1)$$

In this equation, $T_1$ denotes a time constant of the first low-pass filter. If a transfer function $G_o(s, J)$ of an equivalent control object from the torque command basic signal $T_0$* to the electric motor rotational speed $\omega_m$ is to be determined, the transfer function will be represented by Equation (2).

[Eq. 2]

$$G_o(s, J) = \frac{\omega_m(s)}{T_0^*(s)} = \frac{1+T_1 s}{1+(J/J_n)T_1 s} \cdot \frac{1}{J_n s} \quad (2)$$

Further, an equivalent low-pass filter will be represented by the Equation (3).

[Eq. 3]

$$L_o(s, J) = \frac{1+T_1 s}{1+(J/J_n)T_1 s} \quad (3)$$

Hence, the control system shown in FIG. 3 can be redrawn as shown in FIG. 4. According to Equation (3) and FIG. 4, if $T_1$ is set at a sufficiently small value, the influence of the equivalent low-pass filter can be ignored; therefore, since the equivalent control object $G_o(s, J)$ and a nominal plant $P_n(s)$ have substantially similar frequency characteristics in a low frequency range, the following characteristic with respect to a command remains unchanged even if inertia is changed.

In a second conventional technique, there is used a phase advance compensation observer for compensating for the phase delay of a delay element, which has been proposed by the present applicant (see Patent Document 1, for example). FIG. 5 is a block diagram showing a configuration of a servo control apparatus in which the second conventional technique is used. In this diagram, 9 denotes an actual control object including an actual low-pass filter 3 and an actual plant 4, and 6 denotes a phase advance compensation observer including: an observer control object 60 made up of a nominal plant 61 and a second low-pass filter 62; and an observer compensator 63. Further, elements corresponding to those shown in FIG. 3 are identified with the same reference characters, and the description thereof will be omitted.

Next, the principle of operation will be described. In the actual control object, an output of the actual low-pass filter 3 is inputted to the actual plant 4, and in the observer control object 60, an output of the nominal plant 61 is inputted to the second low-pass filter 62. Thus, when $L_2(s)=L(s)$, and $J_n=J$ are satisfied, $\omega_o$, which is an output of the second low-pass filter 62, serves as an estimation speed of an electric motor rotational speed $\omega_m$; therefore, a phase advance estimation speed $\omega_p$, which is an input of the second low-pass filter 62, serves as a phase advance amounting to a phase amount delayed by the second low-pass filter with respect to the electric motor rotational speed $\omega_w$. Accordingly, if the phase advance estimation speed $\omega_p$ is defined as a feedback speed $\omega_f$, there is eliminated the problem of control performance degradation caused by the phase delay of the actual low-pass filter 3 when there is no phase advance compensation observer.

[Non-Patent Document 1] T. IEE Japan, Vol. 117-C, No. 12, 1997, p. 1776-1781

[Patent Document 1] JP-A-2002-182705

DISCLOSURE OF THE INVENTION

Problems to be Solved by the Invention

However, in the first conventional technique, since the observed electric motor rotational speed is fed back to the torque command through the nominal plant inverse system, the influence of a measured noise will be significant as compared with the case of using a normal PI control. In particular, when the load machine inertia is small, the influence is significant. In order to enhance the filtering characteristic with respect to the measured noise, i.e., in order to improve the noise removing characteristic, it is necessary to set the time constant of the first low-pass filter at a large value in accordance with a case where the load machine inertia is small. On the other hand, if the time constant of the first low-pass filter is set in accordance with the case where the load machine inertia is small, there exists a delay element with a large phase delay in a feedback control system when the load machine inertia is increased; therefore, the gain of a PI controller cannot be increased, and the control characteristic cannot be improved. Accordingly, there has been a disadvantage that it is impossible to achieve both of the robust characteristic and the noise removing characteristic.

Furthermore, in the second conventional technique, the phase delay in a feedback control system can be compensated on the premise that the observer control object and the actual control object have substantially similar frequency characteristics in a low frequency range. When the load machine inertia significantly varies, the nominal plant inertia might be significantly deviated from the actual plant, and in this case, since the estimation speed of the phase advance compensation observer is significantly deviated from the electric motor rotational speed, there has been a problem that the input-output characteristics are degraded.

Therefore, the present invention has been made in view of these problems, and its object is to provide a servo control apparatus capable of keeping the influence of a noise within an allowable range, suppressing adverse effects of disturbance, load variation and the like, and realizing robust and high-performance speed control by combining a disturbance observer with a phase advance compensation observer.

Solution to the Problems

In order to solve the above-described problems, the present invention provides a servo control apparatus that allows an electric motor rotational speed to follow a speed command, wherein a disturbance observer and a phase advance compensation observer are incorporated into a normal PI control system, the time constant of a low-pass filter of the disturbance observer is set so that the noise removing characteristic is satisfied when an actual plant inertia is minimized, the time constant of a low-pass filter of the phase advance compensation observer is determined as a value obtained by multiplying the time constant of the low-pass filter of the disturbance observer by the ratio between the maximum value of the actual plant inertia and a nominal plant inertia, and a phase advance estimation speed, serving as a phase advance equal to or greater than a phase amount delayed by an equivalent low-pass filter with respect to the electric motor rotational speed, is defined as a feedback speed.

Effects of the Invention

In the present invention, adverse effects of disturbance, load variation and the like are suppressed by using a disturbance observer, and a phase delay in a feedback control system is compensated by incorporating a phase advance compensation observer, thereby making it possible to realize robust and high-performance speed control.

Figure 1:
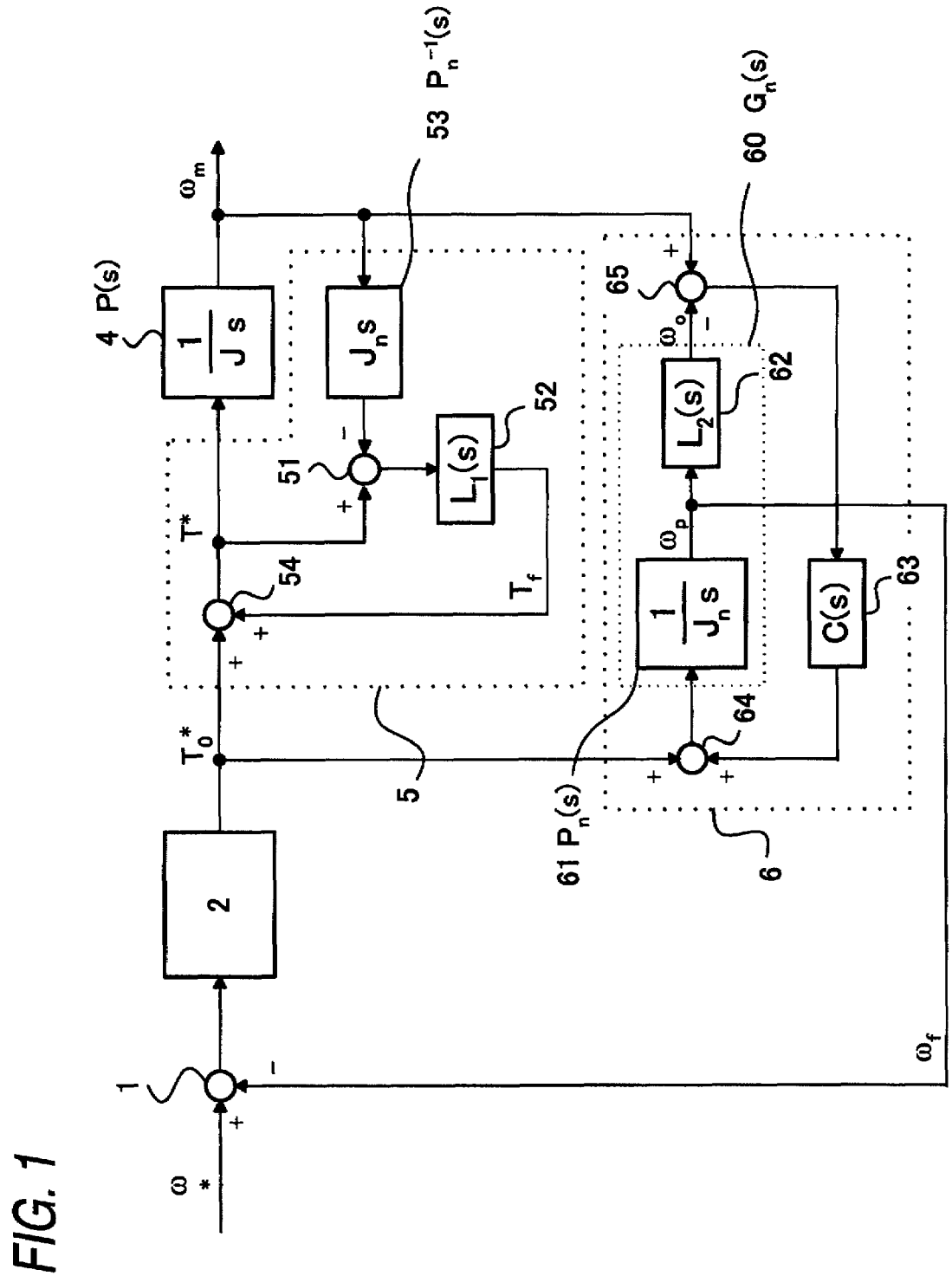
FIG. 1 is a block diagram of a servo control apparatus, showing a first embodiment of the present invention.

DESCRIPTION OF REFERENCE CHARACTERS 1, 51, 64, 65 subtractor
2 PI control section
3 actual low-pass filter
4 actual plant
5 disturbance observer
52 first low-pass filter
53 nominal plant inverse system
54 adder
55 third low-pass filter
6 phase advance compensation observer
60 observer control object
61 nominal plant
62 second low-pass filter
63 observer compensator
7 equivalent low-pass filter
8 equivalent control object
9 actual control object

BEST MODE FOR CARRYING OUT THE INVENTION

Hereinafter, embodiments of the present invention will be described with reference to the drawings.

Embodiment 1

Figure 3:
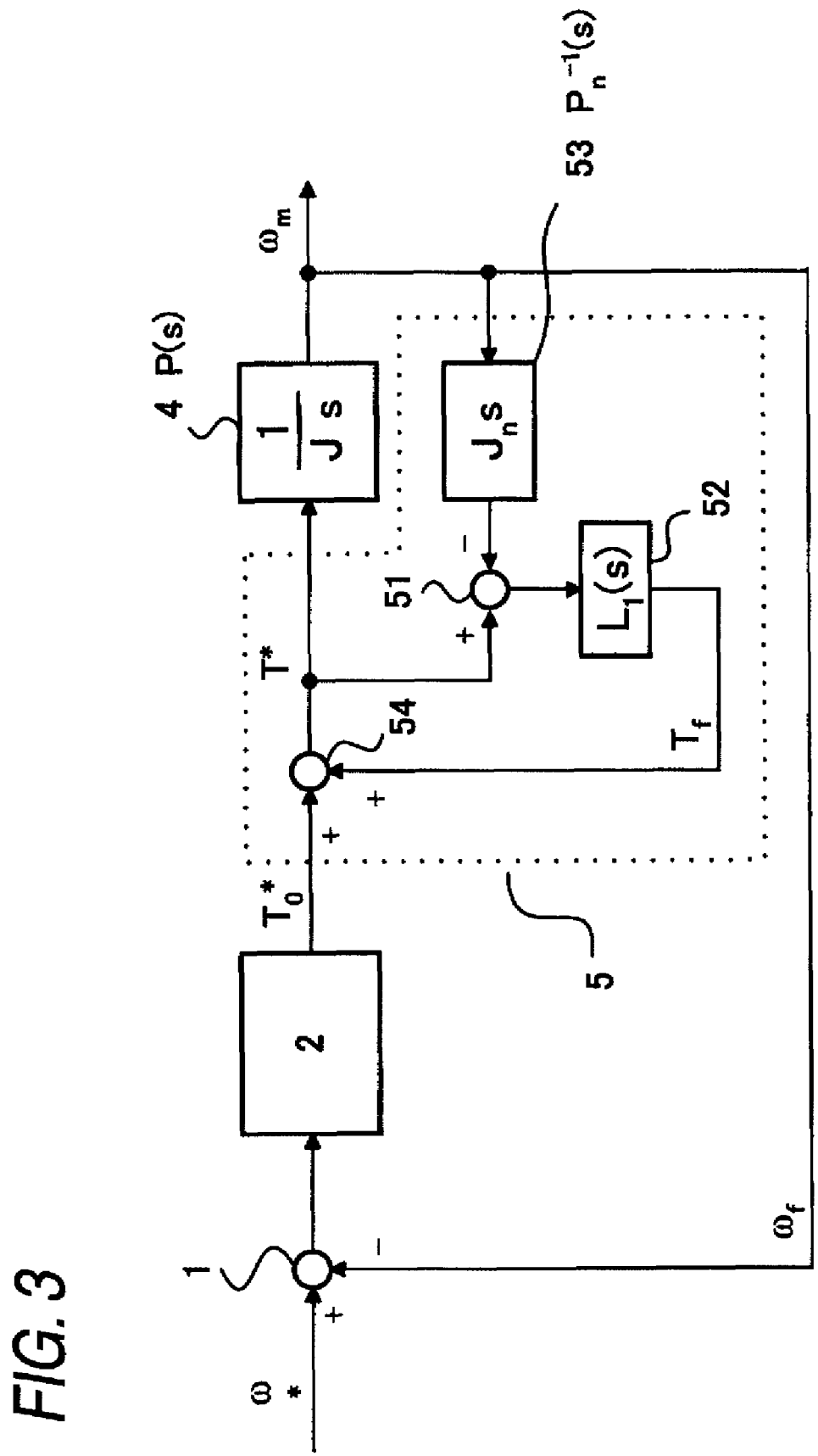
FIG. 3 is a block diagram showing a configuration of a servo control apparatus in which a first conventional technique is used.
Figure 4:
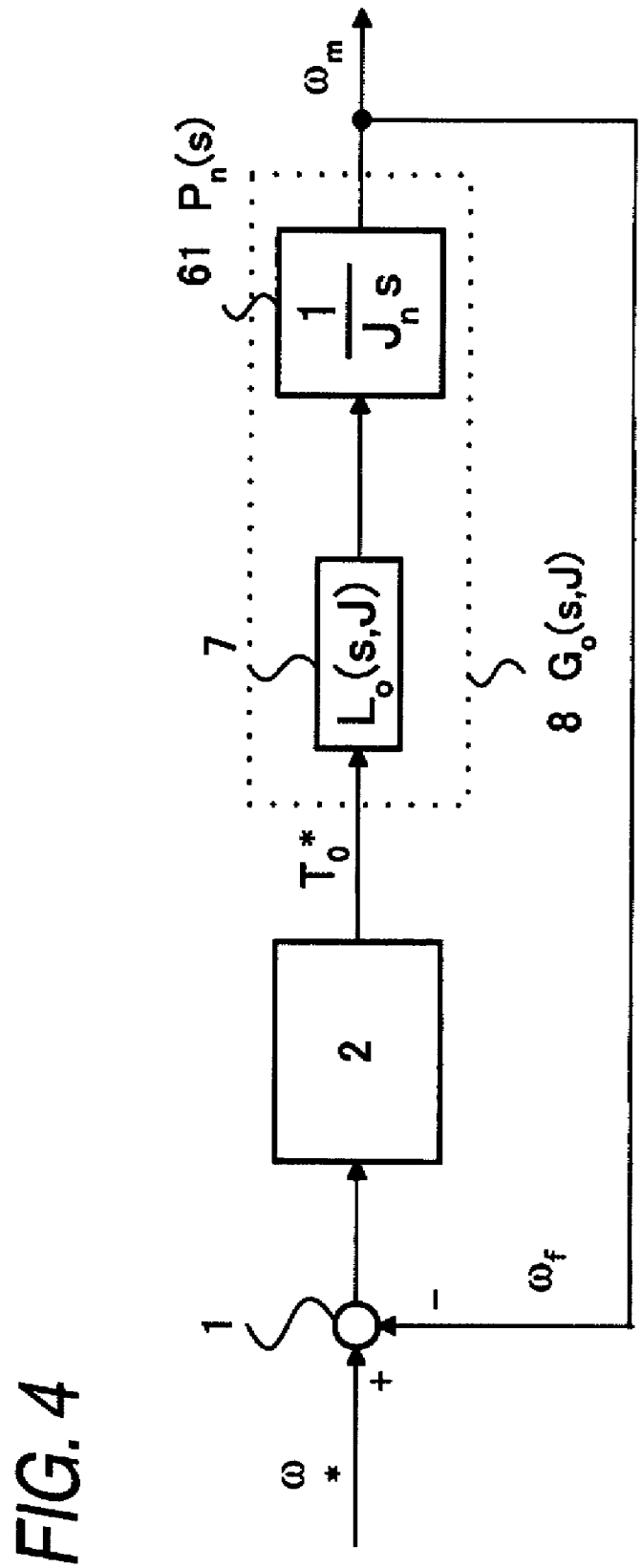
FIG. 4 is an equivalent block diagram of FIG. 3.
Figure 5:
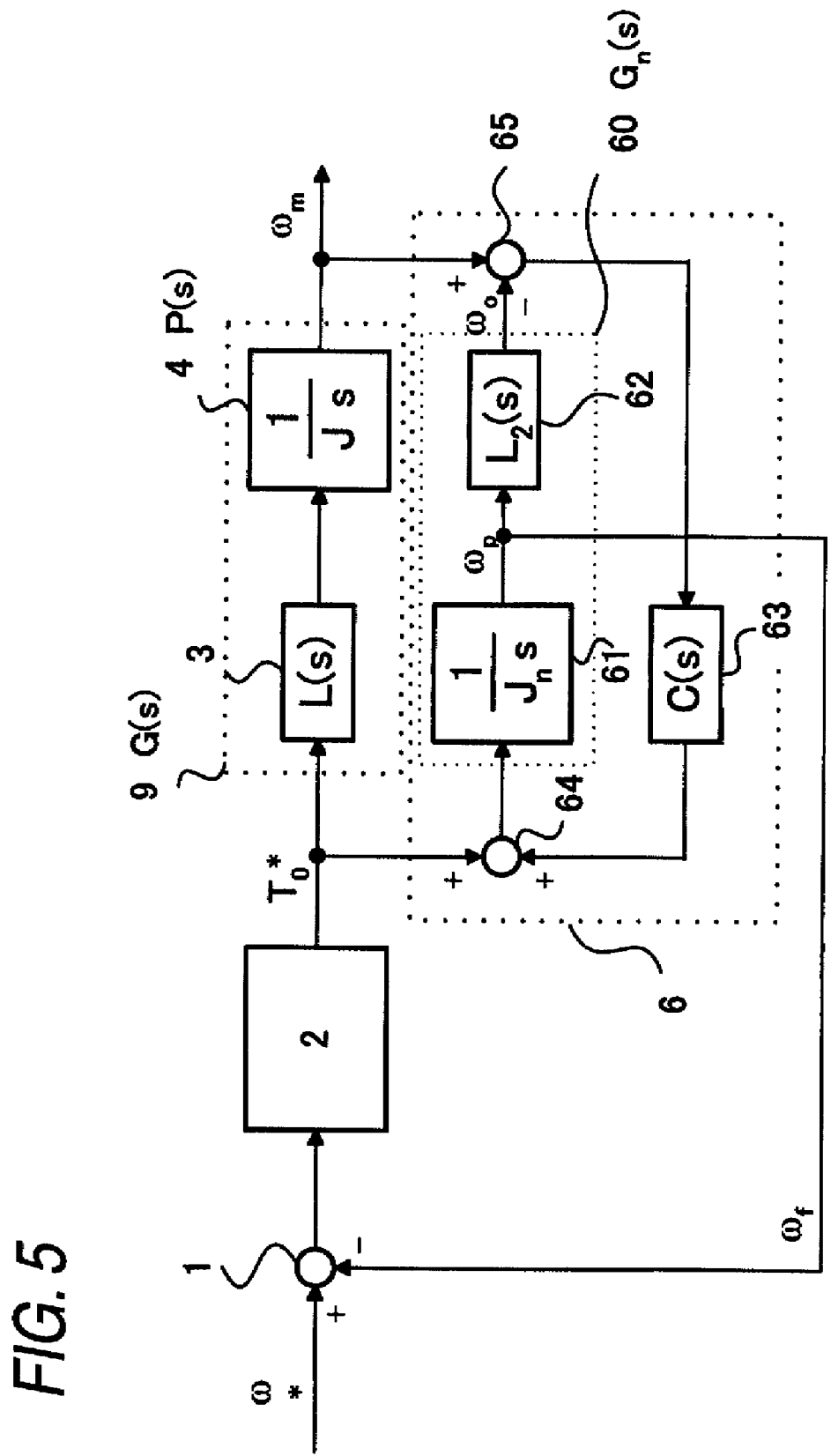
FIG. 5 is a block diagram showing a configuration of a servo control apparatus in which a second conventional technique is used.

FIG. 1 is a block diagram of a servo control apparatus, showing a first embodiment of the present invention, in which respective elements corresponding to those shown in FIG. 3 and FIG. 5 are identified with the same reference characters, and the description thereof will be omitted. Further, $J_m$ denotes a minimum value of an actual plant inertia J, and $J_M$ denotes a maximum value thereof. The present invention is provided by ingeniously combining the first conventional technique with the second conventional technique.

Hereinafter, the principle of operation and configuration method of the control apparatus of the present invention will be described.

Figure 6:
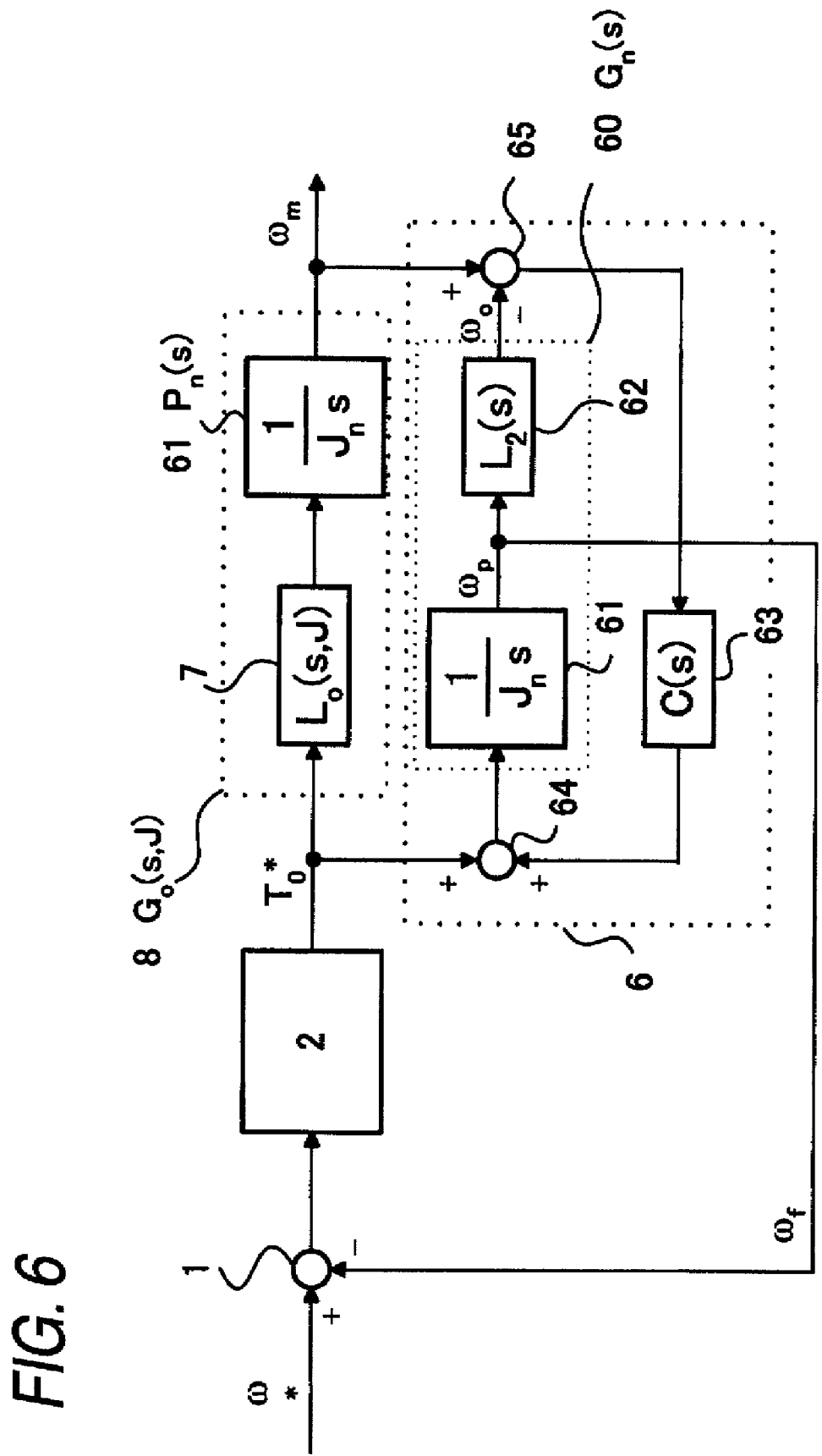
FIG. 6 is an equivalent block diagram of FIG. 1, FIG. 2, and FIGS. 10 to 12.

If a transfer function $G_o$ (s, J) of an equivalent control object 8 from a torque command basic signal $T_0^*$ to an electric motor rotational speed $\omega_m$ is determined similarly to the description of the first conventional technique mentioned above, the control system shown in FIG. 1 can be redrawn as shown in FIG. 6. In this case, the inertia of the equivalent control object 8 has become a nominal inertia $J_n$ that is a constant value. Although the time constant of an equivalent low-pass filter $L_o$ (s, J) is changed in accordance with the actual plant inertia J as shown in Equation (3), an observer control object $G_n(s)$ and the equivalent control object $G_o(s, J)$ have substantially similar frequency characteristics in a low frequency range.

When the actual plant inertia J has become the minimum value $J_m$, if $J_n > J_m$, the equivalent low-pass filter $L_o$ (s, J) has become a serial phase advance element according to Equation (3) and FIG. 6, and therefore, high-frequency oscillation is likely to occur. To cope with this, the nominal inertia $J_n$ is defined as follows:

$$J_n \leq J_m \quad (4)$$

Furthermore, since the influence of the measured noise is the greatest at this time, the time constant of a first low-pass filter $L_1$ (s) is set at the smallest value possible so that the noise removing characteristic is satisfied.

When the actual plant inertia J has become the maximum value $J_M$, the equivalent low-pass filter is represented by Equation (5).

[Eq. 4]

$$L_o(s, J_M) = \frac{1 + T_1 s}{1 + (J_M/J_n)T_1 s} \quad (5)$$

In this case, since the phase delay of the equivalent low-pass filter is the greatest, a second low-pass filter $L_2$ (s) is represented by Equation (6).

[Eq. 5]

$$L_2(s) = L_o(s, J_M) = \frac{1 + T_1 s}{1 + (J_M/J_n)T_1 s} \quad (6)$$

Accordingly, with respect to all the actual plant inertias J, the phase delay of $L_o$ (s, J) is smaller than that of $L_2$ (s), and therefore, a phase advance estimation speed $\omega_p$, which is an input of $L_2$ (s), serves as a phase advance equal to or greater than a phase amount delayed by $L_o$ (s, J) with respect to the electric motor rotational speed $\omega_m$. Further, since the phase advance estimation speed $\omega_p$ is defined as a feedback speed $\omega_f$, there is eliminated the problem of oscillation or instability caused by the phase delay of $L_o$ (s, J) when there is no phase advance compensation observer.

Moreover, when $J_M \gg J_n$ is satisfied, $L_2$ (s) can be defined as a primary low-pass filter represented by Equation (7).

[Eq. 6]

$$L_2(s) = \frac{1}{1 + T_2 s} \quad (7)$$

It is to be noted that the following equation holds true:

$$T_2 = (J_M/J_n)T_1 \quad (8)$$

Thus, using a disturbance observer, an actual control object G (s) is converted from the actual plant P (s), in which inertia is varied, to: a nominal plant Pn (s) in which inertia is equivalently constant; and the equivalent low-pass filter $L_o$ (s, J) the time constant of which is changed by the actual plant inertia, and the phase delay of the equivalent low-pass filter is compensated using a phase advance compensation observer, thereby making it possible to realize robust and high-performance speed control even if the actual plant inertia is significantly changed.

Embodiment 2

Figure 2:
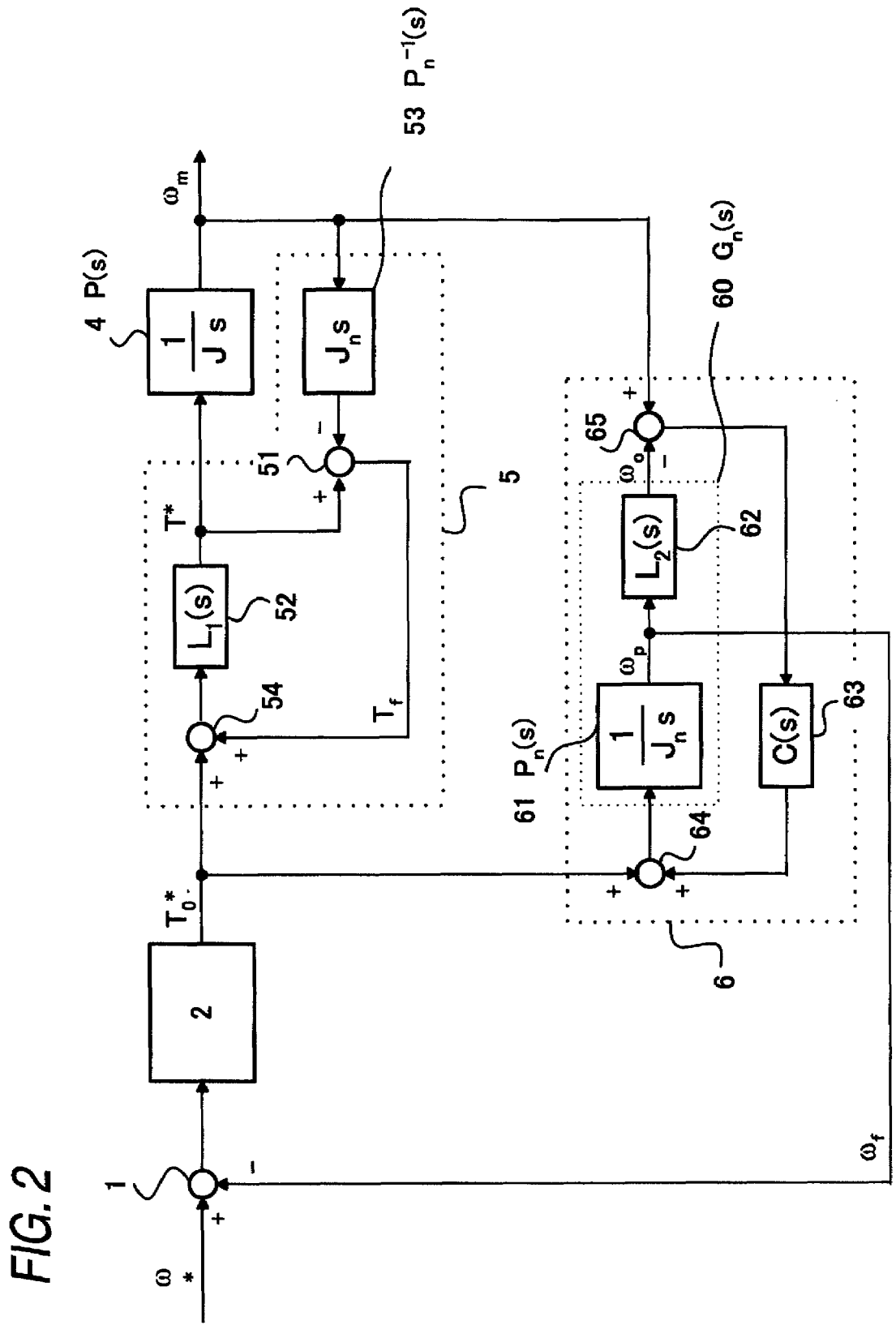
FIG. 2 is a block diagram of a servo control apparatus, showing a second embodiment of the present invention.

FIG. 2 is a block diagram of a servo control apparatus, showing a second embodiment of the present invention.

The present embodiment is different from the first embodiment in that the first low-pass filter 52 in contact with an output of a subtractor 51 is translocated so as to be in contact with an output of an adder 54.

Next, the principle of operation will be described.

If the transfer function of the equivalent control object $G_o$ (s, J) from the torque command basic signal $T_0^*$ to the electric motor rotational speed $\omega_m$ is to be determined, the transfer function will be represented by Equation (9).

[Eq. 7]

$$G_o(s, J) = \frac{\omega_m(s)}{T_0^*(s)} = \frac{1}{1 + (J/J_n)T_1 s} \cdot \frac{1}{J_n s} \quad (9)$$

Further, the equivalent low-pass filter 7 will be represented by Equation (10).

[Eq. 8]

$$L_o(s, J) = \frac{1}{1 + T_o s} \quad (10)$$

It is to be noted that the following equation represents the time constant of the equivalent low-pass filter 7:

$$T_o = (J/J_n)T_1 \quad (11)$$

Hence, the control system shown in FIG. 2 can be redrawn as shown in FIG. 6 similarly to Embodiment 1.

$L_2$ (S) is defined as a primary low-pass filter represented by Equation (12).

[Eq. 9]

$$L_2(s) = \frac{1}{1 + T_2 s} \quad (12)$$

It is to be noted that the following equation holds true:

$$T_2 = (J_M/J_n)T_1 \quad (13)$$

Accordingly, with respect to all the actual plant inertias J, the phase delay of $L_o$ (s, J) is smaller than that of $L_2$ (s), and therefore, the phase advance estimation speed $\omega_p$, which is an input of $L_2$ (s), serves as a phase advance equal to or greater than a phase amount delayed by $L_o$ (s, J) with respect to the electric motor rotational speed $\omega_m$. Further, since the phase advance estimation speed $\omega_p$ is defined as the feedback speed $\omega_f$, there is eliminated the problem of oscillation or instability caused by the phase delay of $L_o$ (s, J) when there is no phase advance compensation observer.

Thus, although the phase delay of the equivalent low-pass filter is slightly increased as compared with the first embodiment, a noise component coming from a PI controller 2 can be removed.

Embodiment 3

Figure 10:
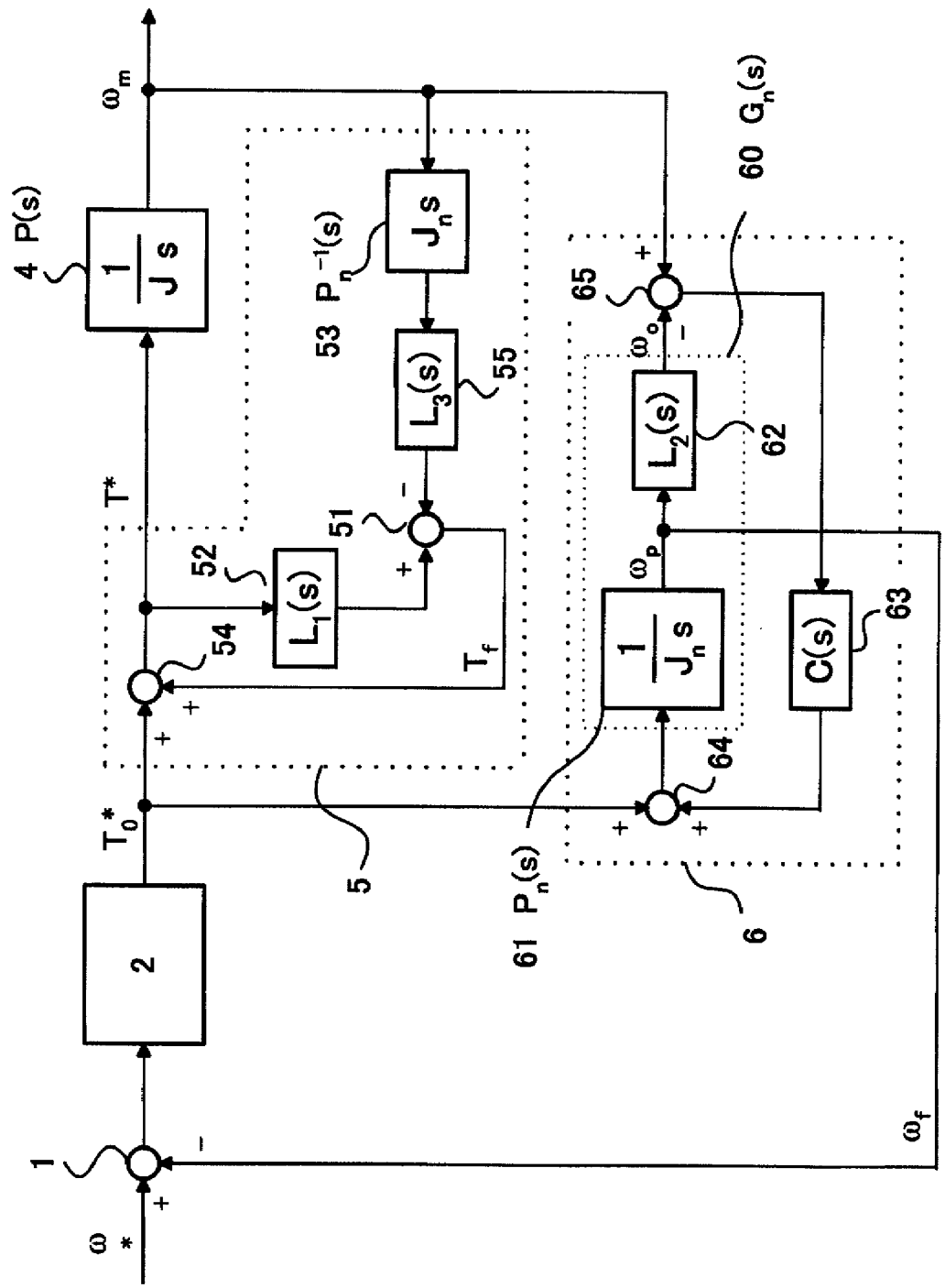
FIG. 10 is a block diagram of a servo control apparatus, showing a third embodiment of the present invention.

FIG. 10 is a block diagram of a servo control apparatus, showing a third embodiment of the present invention.

The present embodiment is different from the first embodiment in that the first low-pass filter 52 in contact with the output of the subtractor 51 is translocated so as to be located between a torque command T* and the subtractor 51, and a third low-pass filter 55 is added between a nominal plant inverse system 53 and the subtractor 51.

Next, the principle of operation will be described.

The first low-pass filter 52 is defined as a primary low-pass filter represented by Equation (1), and the third low-pass filter 55 is defined as a primary low-pass filter represented by Equation (14).

[Eq. 10]

$$L_3(s) = \frac{1}{1 + T_3 s} \quad (14)$$

In this equation, $T_3$ denotes the time constant of the third low-pass filter.

If the transfer function of the equivalent control object $G_o$ (s, J) from the torque command basic signal $T_0^*$ to the electric motor rotational speed $\omega_m$ is to be determined, the transfer function will be represented by Equation (15).

[Eq. 11]

$$G_o(s, J) = \frac{\omega_m(s)}{T_0^*(s)} = \frac{(1 + T_1 s)(1 + T_3 s)}{1 + (1 + J/J_n)T_1 s + J/J_n \cdot T_1 T_3 s^2} \cdot \frac{1}{J_n s} \quad (15)$$

Further, the equivalent low-pass filter 7 will be represented by Equation (16).

[Eq. 12]

$$L_o(s, J) = \frac{(1 + T_1 s)(1 + T_3 s)}{1 + (1 + J/J_n)T_1 s + J/J_n \cdot T_1 T_3 s^2} \quad (16)$$

Hence, the control system shown in FIG. 10 can be redrawn as shown in FIG. 6 similarly to Embodiment 1. Furthermore, $L_2(S)$ is defined as a low-pass filter represented by Equation (17).

[Eq. 13]

$$L_2(s) = L_o(s, J_M) = \frac{(1 + T_1 s)(1 + T_3 s)}{1 + (1 + J_M/J_n)T_1 s + J_M/J_n \cdot T_1 T_3 s^2} \quad (17)$$

Accordingly, with respect to all the actual plant inertias J, the phase delay of $L_o$ (s, J) is smaller than that of $L_2$ (s), and therefore, the phase advance estimation speed $\omega_p$, which is an input of $L_2$ (s), serves as a phase advance equal to or greater than a phase amount delayed by $L_o$ (s, J) with respect to the electric motor rotational speed $\omega_m$. Further, since the phase advance estimation speed $\omega_p$ is defined as the feedback speed $\omega_f$, there is eliminated the problem of oscillation or instability caused by the phase delay of $L_o$ (s, J) when there is no phase advance compensation observer.

Moreover, when $J_M \gg J_n$ is satisfied, $L_2$ (S) can be defined as a primary low-pass filter represented by Equation (18).

[Eq. 14]

$$L_2(s) = \frac{1}{1 + T_2 s} \quad (18)$$

It is to be noted that the following equation holds true:

$$T_2 = (J_M/J_n)T_1 \quad (19)$$

According to Equation (17), Equation (18) and Equation (19), the parameter of the first low-pass filter 52 has a great influence on the robust characteristic of the control system, while the parameter of the third low-pass filter 55 does not have much influence on the robust characteristic of the control system. However, a noise component included in the detected electric motor rotational speed $\omega_m$ is amplified by the nominal plant system 53, and added to the torque command through the third low-pass filter 55, and therefore, the parameter setting of the third low-pass filter 55 greatly influences the disturbance removing characteristic of the control system.

If the first low-pass filter 52 and the third low-pass filter 55 are similar, the present embodiment shown in FIG. 10 and the first embodiment shown in FIG. 1 are perfectly equivalent to each other. However, in the present embodiment, although the control system is slightly complicated as compared with the first embodiment, the parameter of the first low-pass filter 52 and the parameter of the third low-pass filter 55 are separately set, thus making it possible to achieve both of amore robust characteristic and amore favorable noise removing characteristic.

Furthermore, in FIG. 10, the third low-pass filter 55 can be moved so as to be located in front of the actual plant 4. Thus, although the phase delay is slightly increased for the entire loop, the effect of removing the noise component coming from the torque command basic signal $T_0^*$ can be enhanced.

Embodiment 4

Figure 11:
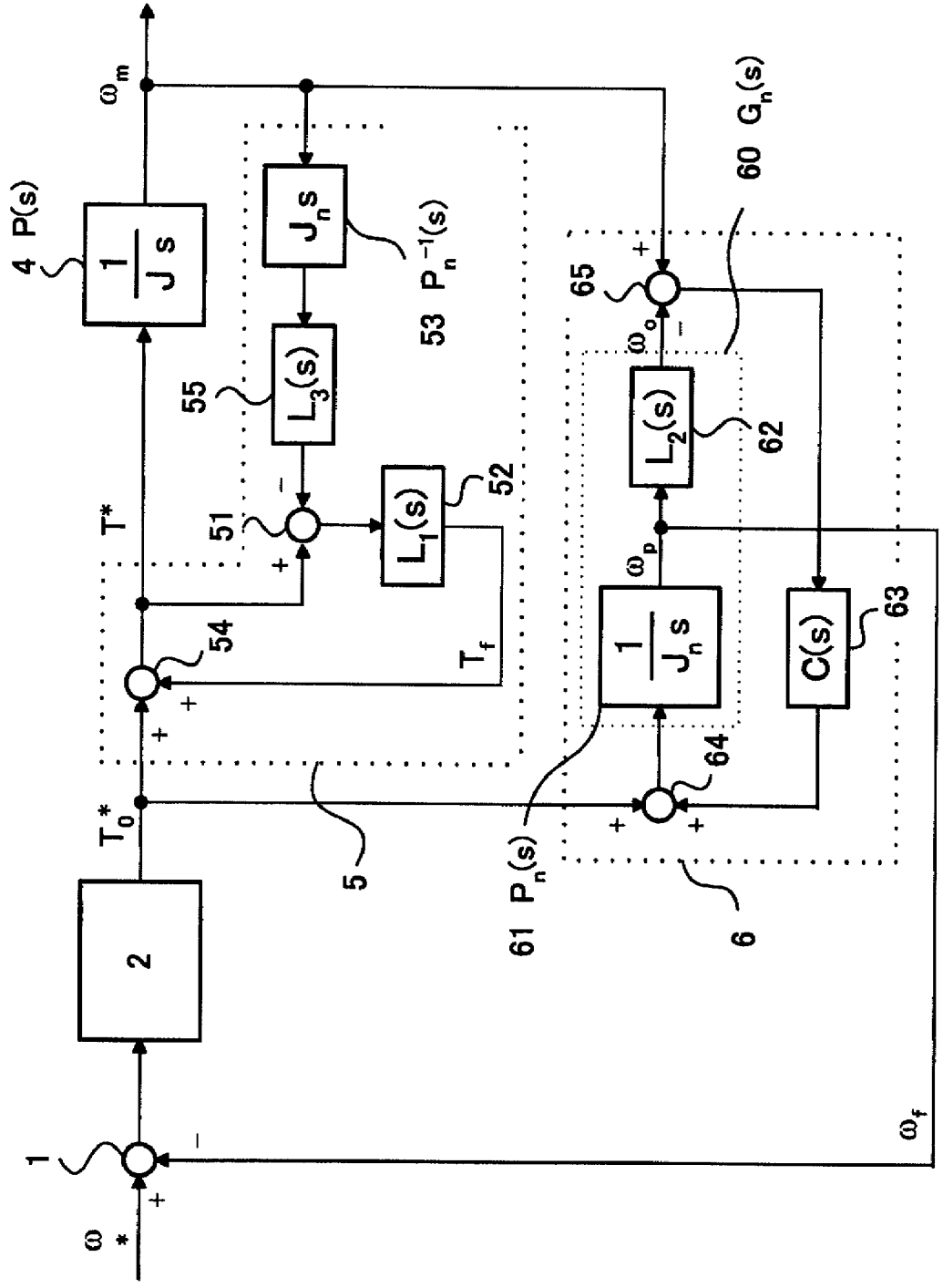
FIG. 11 is a block diagram of a servo control apparatus, showing a fourth embodiment of the present invention.

FIG. 11 is a block diagram of a servo control apparatus, showing a fourth embodiment of the present invention.

The present embodiment is different from the first embodiment in that the third low-pass filter 55 is added between the nominal plant inverse system 53 and the subtractor 51.

Next, the principle of operation will be described.

The first low-pass filter 52 is defined as a primary low-pass filter represented by Equation (1), and the third low-pass filter 55 is defined as a primary low-pass filter represented by Equation (20).

[Eq. 15]

$$L_3(s) = \frac{1}{1 + T_3 s} \quad (20)$$

In this equation, $T_3$ denotes the time constant of the third low-pass filter.

If the transfer function of the equivalent control object $G_o$ (s, J) from the torque command basic signal $T_0^*$ to the electric motor rotational speed $\omega_m$ is to be determined, the transfer function will be represented by Equation (21).

[Eq. 16]

$$G_o(s, J) = \frac{\omega_m(s)}{T_0^*(s)} = \frac{(1+T_1 s)(1+T_3 s)}{1+J/J_n \cdot T_1 s + J/J_n \cdot T_1 T_3 s^2} \cdot \frac{1}{J_n s} \quad (21)$$

Further, the equivalent low-pass filter 7 will be represented by Equation (22).

[Eq. 17]

$$L_o(s, J) = \frac{(1+T_1 s)(1+T_3 s)}{1+J/J_n \cdot T_1 s + J/J_n \cdot T_1 T_3 s^2} \quad (22)$$

Hence, the control system shown in FIG. 11 can be redrawn as shown in FIG. 6 similarly to Embodiment 1. Furthermore, $L_2$ (s) is defined as a low-pass filter represented by Equation (23).

[Eq. 18]

$$L_2(s) = L_o(s, J_M) = \frac{(1+T_1 s)(1+T_3 s)}{1+J_M/J_n \cdot T_1 s + J_M/J_n \cdot T_1 T_3 s^2} \quad (23)$$

Accordingly, with respect to all the actual plant inertias J, the phase delay of $L_o$ (s, J) is smaller than that of $L_2$ (s), and therefore, the phase advance estimation speed $\omega_p$, which is an input of $L_2$ (s), serves as a phase advance equal to or greater than a phase amount delayed by $L_o$ (s, J) with respect to the electric motor rotational speed $\omega_m$. Further, since the phase advance estimation speed $\omega_p$ is defined as the feedback speed $\omega_f$, there is eliminated the problem of oscillation or instability caused by the phase delay of $L_o$ (s, J) when there is no phase advance compensation observer.

Moreover, when $J_M \gg J_n$ is satisfied, $L_2$ (s) can be defined as a primary low-pass filter represented by Equation (24).

[Eq. 19]

$$L_2(s) = \frac{1}{1+T_2 s} \quad (24)$$

It is to be noted that the following equation holds true:

$$T_2 = (J_M/J_n)T_1 \quad (25)$$

According to Equation (23), Equation (24) and Equation (25), the parameter of the first low-pass filter 52 has a great influence on the robust characteristic of the control system, while the parameter of the third low-pass filter 55 does not have much influence on the robust characteristic of the control system. On the other hand, a noise component included in the detected electric motor rotational speed $\omega_m$ is amplified by the nominal plant system 53, and added to the torque command through the third low-pass filter 55 and the first low-pass filter 52, and therefore, the parameters of both of the third low-pass filter 55 and the first low-pass filter 52 influence the disturbance removing characteristic of the control system. Hence, the robust characteristic of the control system can be improved by appropriately setting the parameter of the first low-pass filter 52, and the disturbance removing characteristic of the control system can be improved by appropriately setting the parameter of the third low-pass filter 55.

Thus, although the control system is slightly complicated as compared with the first embodiment, the noise removing characteristic can be taken into consideration so as not to exert much influence on the robust characteristic, and therefore, the control characteristic can be further improved.

Furthermore, in FIG. 11, the third low-pass filter 55 can be moved so as to be located in front of the actual plant 4. Thus, although the phase delay is slightly increased for the entire loop, the effect of removing the noise component coming from the torque command basic signal $T_0^*$ can be enhanced.

Embodiment 5

Figure 12:
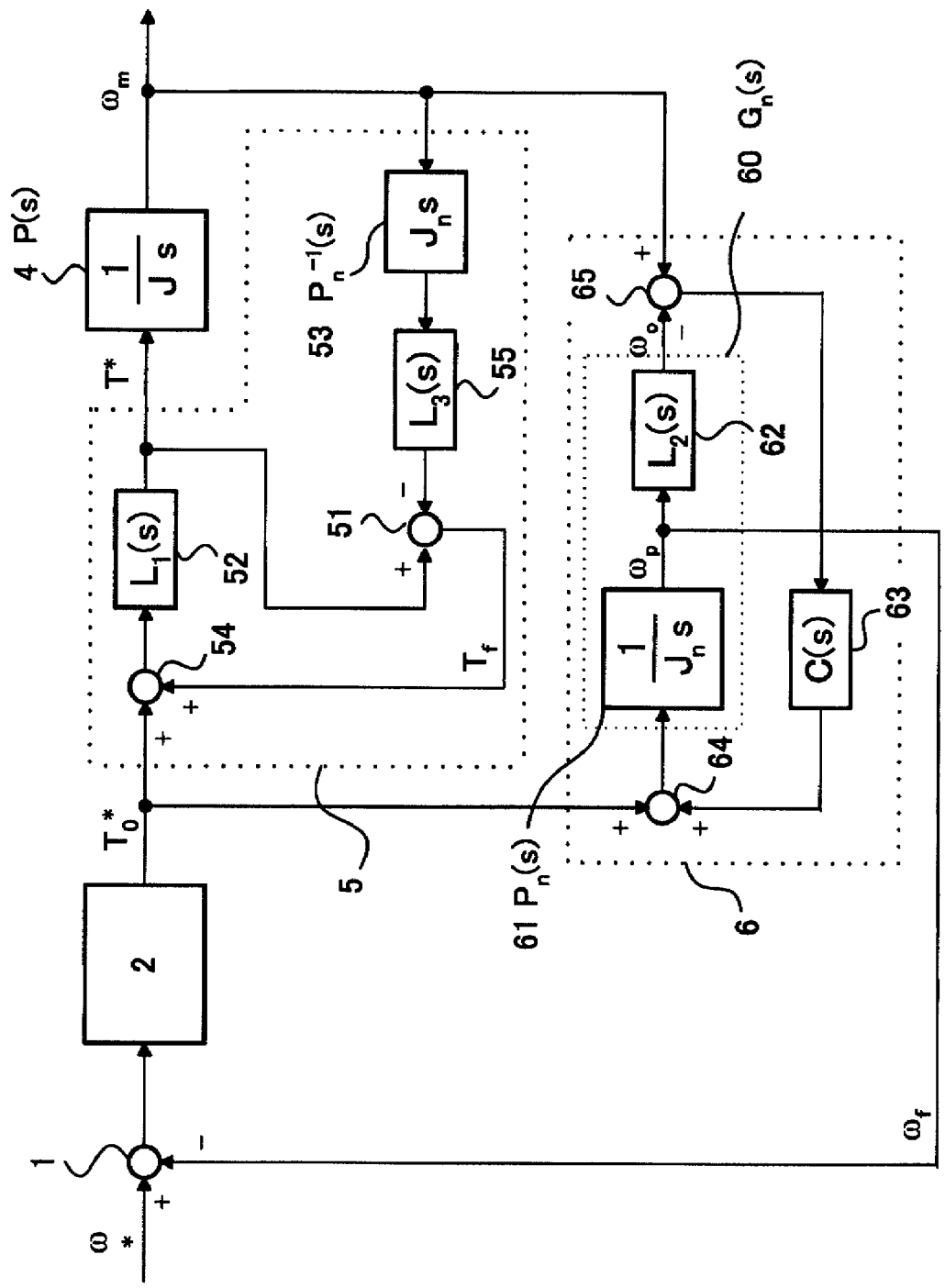
FIG. 12 is a block diagram of a servo control apparatus, showing a fifth embodiment of the present invention.

FIG. 12 is a block diagram of a servo control apparatus, showing a fifth embodiment of the present invention.

The present embodiment is different from the second embodiment in that the third low-pass filter 55 is added between the nominal plant inverse system 53 and the subtractor 51.

Next, the principle of operation will be described.

The first low-pass filter 52 is defined as a primary low-pass filter represented by Equation (1), and the third low-pass filter 55 is defined as a primary low-pass filter represented by Equation (26).

[Eq. 20]

$$L_3(s) = \frac{1}{1+T_3 s} \quad (26)$$

In this equation, $T_3$ denotes the time constant of the third low-pass filter.

If the transfer function of the equivalent control object $G_o$ (s, J) from the torque command basic signal $T_0^*$ to the electric motor rotational speed $\omega_m$ is to be determined, the transfer function will be represented by Equation (27).

[Eq. 21]

$$G_o(s, J) = \frac{\omega_m(s)}{T_0^*(s)} = \frac{(1+T_3 s)}{1+J/J_n \cdot T_1 s + J/J_n \cdot T_1 T_3 s^2} \cdot \frac{1}{J_n s} \quad (27)$$

Further, the equivalent low-pass filter 7 will be represented by Equation (28).

[Eq. 22]

$$L_o(s, J) = \frac{(1+T_1 s)}{1+J/J_n \cdot T_1 s + J/J_n \cdot T_1 T_3 s^2} \quad (28)$$

Hence, the control system shown in FIG. 12 can be redrawn as shown in FIG. 6 similarly to Embodiment 2. Furthermore, $L_2$ (S) is defined as a low-pass filter represented by Equation (29).

[Eq. 23]

$$L_2(s) = L_o(s, J_M) = \frac{(1+T_1 s)}{1+J_M/J_n \cdot T_1 s + J_M/J_n \cdot T_1 T_3 s^2} \quad (29)$$

Accordingly, with respect to all the actual plant inertias J, the phase delay of $L_o$ (s, J) is smaller than that of $L_2$ (s), and therefore, the phase advance estimation speed $\omega_p$, which is an input of $L_2$ (s), serves as a phase advance equal to or greater than a phase amount delayed by $L_o$ (s, J) with respect to the electric motor rotational speed $\omega_m$. Further, since the phase advance estimation speed $\omega_p$ is defined as the feedback speed of, there is eliminated the problem of oscillation or instability caused by the phase delay of $L_o$ (s, J) when there is no phase advance compensation observer.

Moreover, when $J_M \gg J_n$ is satisfied, $L_2$ (S) can be defined as a primary low-pass filter represented by Equation (30).

[Eq. 24]

$$L_2(s) = \frac{1}{1+T_2 s} \quad (30)$$

It is to be noted that the following equation holds true:

$$T_2 = (J_M/J_n)T_1 \quad (31)$$

According to Equation (29), Equation (30) and Equation (31), the parameter of the first low-pass filter 52 has a great influence on the robust characteristic of the control system, while the parameter of the third low-pass filter 55 does not have much influence on the robust characteristic of the control system. On the other hand, a noise component included in the detected electric motor rotational speed $\omega_m$ is amplified by the nominal plant system 53, and added to the torque command through the third low-pass filter 55 and the first low-pass filter 52, and therefore, the parameters of both of the third low-pass filter 55 and the first low-pass filter 52 influence the disturbance removing characteristic of the control system. Hence, the robust characteristic of the control system can be improved by appropriately setting the parameter of the first low-pass filter 52, and the disturbance removing characteristic of the control system can be improved by appropriately setting the parameter of the third low-pass filter 55.

Thus, although the control system is slightly complicated as compared with the second embodiment, the noise removing characteristic can be taken into consideration so as not to exert much influence on the robust characteristic, and therefore, the control characteristic can be further improved.

Furthermore, in FIG. 12, the third low-pass filter 55 can be moved so as to be located in front of the actual plant 4. Thus, although the phase delay is slightly increased for the entire loop, the effect of removing the noise component coming from the torque command basic signal $T_0^*$ can be enhanced.

Figure 7:
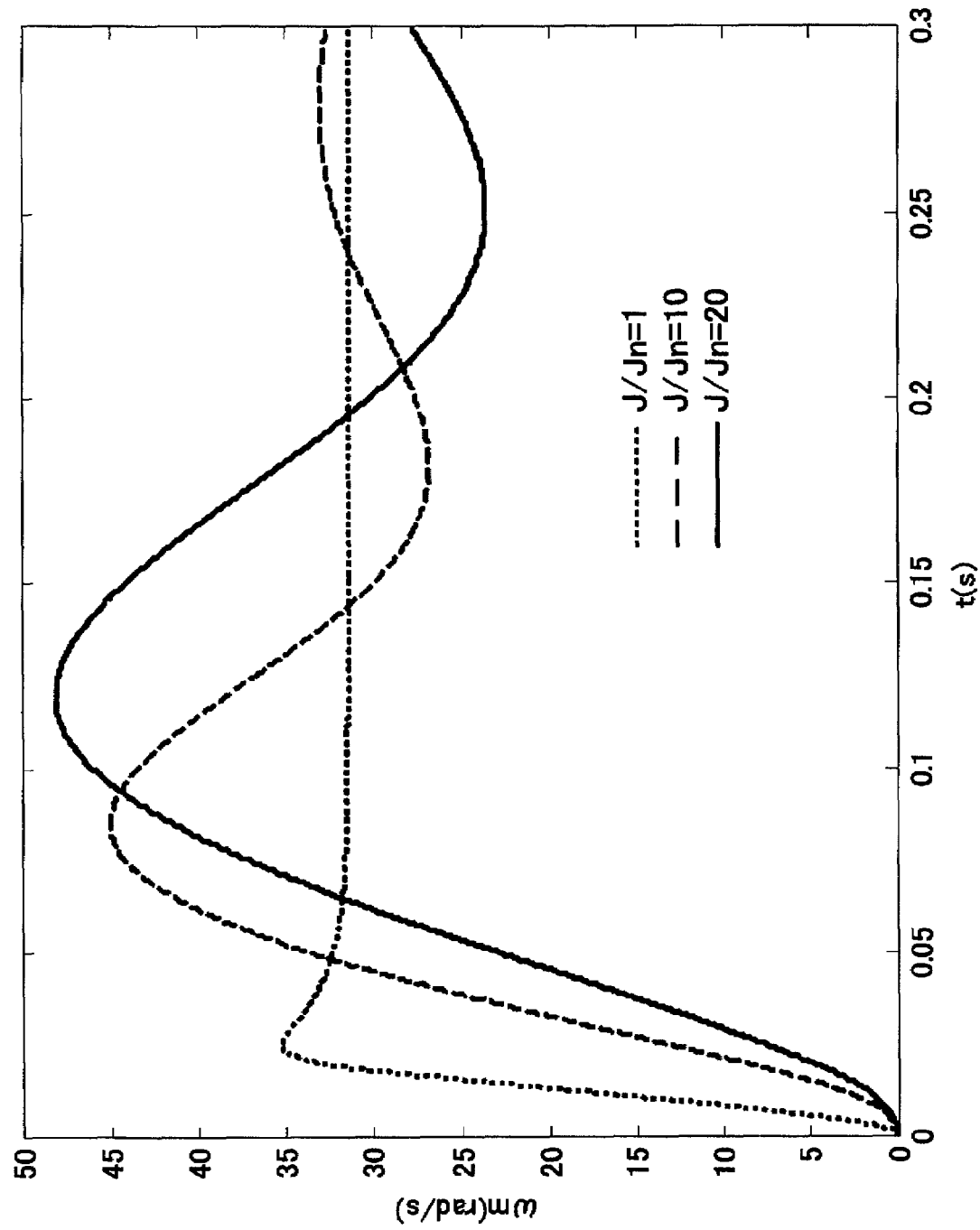
FIG. 7 is a graph showing simulation results obtained by a servo control apparatus in which a normal PI control is used.
Figure 8:
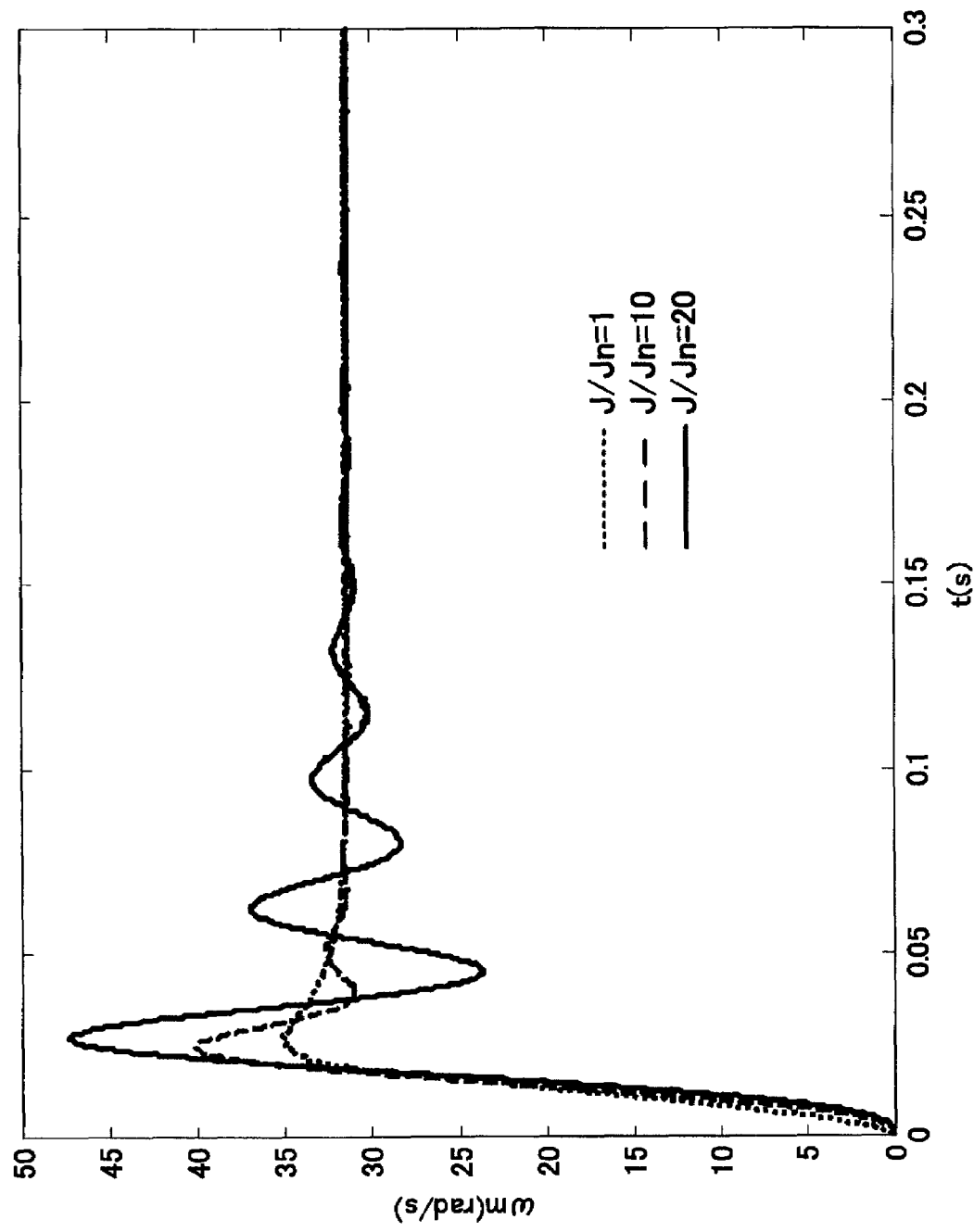
FIG. 8 is a graph showing simulation results obtained by a servo control apparatus in which the first conventional technique is used.
Figure 9:
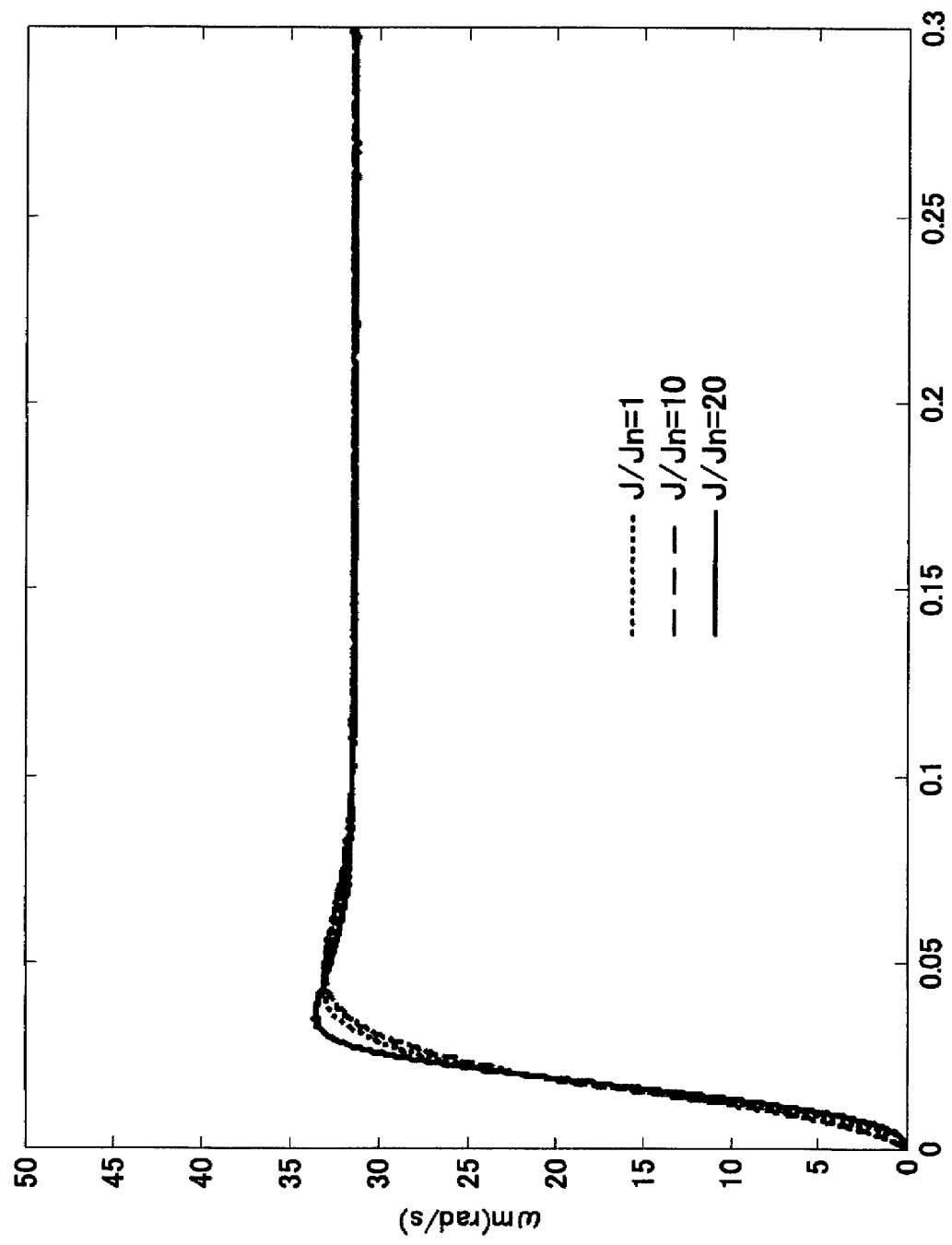
FIG. 9 is a graph showing simulation results obtained by a servo control apparatus in which the technique of the present invention is used.

Next, the effects of the present invention will be described using specific examples. FIG. 7, FIG. 8 and FIG. 9 show simulation results obtained by using a normal PI control, the first conventional technique, and the technique of the present invention, respectively, for the actual plant in which twenty-fold variation occurs in inertia. It can be seen that in the case of using the technique of the present invention, even if inertia is significantly varied, overshot is small and settling time is short, i.e., the high-performance following characteristic with respect to a command virtually remains unchanged, as compared with the cases of using the normal PI control and the first conventional technique.

INDUSTRIAL APPLICABILITY

A normal PI control system is combined with a disturbance observer including a nominal plant inverse system, and a phase advance compensation observer including a nominal plant to compensate for the parameter variation of an actual plant, thereby making it possible to realize robust and high-performance control; thus, the present invention can also be applied for use in following a command in a robust and high-performance manner for a system in which in addition to a servo, any nominal plant is represented as a non-minimum phase system and a parameter is significantly varied.

The invention claimed is:

1. A servo control apparatus for performing drive control on an electric motor and a load machine on the basis of a torque command, comprising:
   a PI control section for calculating a basic signal of the torque command on the basis of a deviation between a speed command and a feedback speed,
   a disturbance observer for outputting the torque command on the basis of the basic signal of the torque command and a rotational speed of the electric motor; and
   a phase advance compensation observer for generating, from the basic signal of the torque command and the rotational speed of the electric motor, an output of a nominal plant serving as an element in which no delay occurs to output the output as the feedback speed, wherein
   the disturbance observer inputs the rotational speed of the electric motor to an inverse system of the nominal plant, determines, as a disturbance estimation signal, a value obtained by subtracting an output of the inverse system of the nominal plant from the torque command, inputs the disturbance estimation signal to a first low-pass filter, and adds an output of the first low-pass filter to the basic signal of the torque command to obtain the torque command.

2. The servo control apparatus according to claim 1, wherein
   the disturbance observer comprises a third low-pass filter to which an output of the inverse system of the nominal plant is input, determines, as a disturbance estimation signal, a value obtained by subtracting an output of the third low-pass filter from the torque command, and inputs the disturbance estimation signal to the first low-pass filter.

3. The servo control apparatus according to claim 1, wherein
   the phase advance compensation observer inputs a deviation between the rotational speed of the electric motor and an output of a second low-pass filter to an observer compensator, inputs a signal, obtained by adding an output of the observer compensator to the basic signal of the torque command, to the nominal plant, and outputs an output of the nominal plant as the feedback speed while inputting the output of the nominal plant to the second low-pass filter.

4. The servo control apparatus according to claim 1, wherein
   a time constant of the first low-pass filter is set at a minimal value upon satisfaction of stability and noise removing characteristic, when inertia of an actual plant including a rotor of the electric motor and the load machine is minimized.

5. A servo control apparatus for performing drive control on an electric motor and a load machine on the basis of a torque command, comprising:
   a PI control section for calculating a basic signal of the torque command on the basis of a deviation between a speed command and a feedback speed, a disturbance observer for outputting the torque command on the basis of the basic signal of the torque command and a rotational speed of the electric motor; and a phase advance compensation observer for generating, from the basic signal of the torque command and the rotational speed of the electric motor, an output of a nominal plant serving as an element in which no delay occurs to output the output as the feedback speed, wherein the disturbance observer inputs the rotational speed of the electric motor to an inverse system of the nominal plant, determines, as a disturbance estimation signal, a value obtained by subtracting an output of the inverse system of the nominal plant from the torque command, and adds the disturbance estimation signal to the basic signal of the torque command, and inputs to a first low-pass filter to obtain an output of the first low-pass filter as the torque command.

6. The servo control apparatus according to claim 5, wherein the disturbance observer comprises a third low-pass filter to which an output of the inverse system of the nominal plant is input, determines, as a disturbance estimation signal, a value obtained by subtracting an output of the third low-pass filter from the torque command, adds the disturbance estimation signal to the basic signal of the torque command, and inputs to the first low-pass filter.

7. The servo control apparatus according to claim 5, wherein a time constant of the first low-pass filter is set at a minimal value upon satisfaction of stability and noise removing characteristic, when inertia of an actual plant including a rotor of the electric motor and the load machine is minimized.

8. The servo control apparatus according to claim 5, wherein the phase advance compensation observer inputs a deviation between the rotational speed of the electric motor and an output of a second low-pass filter to an observer compensator, inputs a signal, obtained by adding an output of the observer compensator to the basic signal of the torque command, to the nominal plant, and outputs an output of the nominal plant as the feedback speed while inputting the output of the nominal plant to the second low-pass filter.

9. A servo control apparatus for performing drive control on an electric motor and a load machine on the basis of a torque command, comprising:

a PI control section for calculating a basic signal of the torque command on the basis of a deviation between a speed command and a feedback speed, a disturbance observer for outputting the torque command on the basis of the basic signal of the torque command and a rotational speed of the electric motor; and a phase advance compensation observer for generating, from the basic signal of the torque command and the rotational speed of the electric motor, an output of a nominal plant serving as an element in which no delay occurs to output the output as the feedback speed, wherein the disturbance observer inputs the torque command to a first low-pass filter, inputs the rotational speed of the electric motor to an inverse system of the nominal plant, inputs an output of the inverse system of the nominal plant to a third low-pass filter, determines, as a disturbance estimation signal, a value obtained by subtracting an output of the third low-pass filter from an output of the first low-pass filter, and adds the disturbance estimation signal to the basic signal of the torque command to obtain the torque command.

10. The servo control apparatus according to claim 9, wherein a time constant of the first low-pass filter and a time constant of the third low-pass filter are set at a minimal value upon satisfaction of stability and noise removing characteristic, when inertia of an actual plant including a rotor of the electric motor and the load machine is minimized.

11. The servo control apparatus according to claim 9, wherein the phase advance compensation observer inputs a deviation between the rotational speed of the electric motor and an output of a second low-pass filter to an observer compensator, inputs a signal, obtained by adding an output of the observer compensator to the basic signal of the torque command, to the nominal plant, and outputs an output of the nominal plant as the feedback speed while inputting the output of the nominal plant to the second low-pass filter.

* * * * *